US010282225B2

United States Patent
Vincent

(10) Patent No.: US 10,282,225 B2
(45) Date of Patent: *May 7, 2019

(54) VIRTUAL MACHINE MORPHING FOR HETEROGENEOUS MIGRATION ENVIRONMENTS

(71) Applicant: Amazon Technologies, Inc., Seattle, WA (US)

(72) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/141,697

(22) Filed: Apr. 28, 2016

(65) Prior Publication Data

US 2016/0246640 A1 Aug. 25, 2016

Related U.S. Application Data

(63) Continuation of application No. 12/965,723, filed on Dec. 10, 2010, now Pat. No. 9,329,886.

(51) Int. Cl.
*G06F 9/455* (2018.01)
*G06F 9/48* (2006.01)
(Continued)

(52) U.S. Cl.
CPC ........ *G06F 9/45558* (2013.01); *G06F 9/4856* (2013.01); *G06F 3/0647* (2013.01);
(Continued)

(58) Field of Classification Search
CPC ... G06F 2009/4557; G06F 2009/45595; G06F 2201/865; G06F 2212/151; G06F 3/0647;
(Continued)

(56) References Cited

U.S. PATENT DOCUMENTS 7,506,037 B1  3/2009 Ciano et al.
8,171,349 B2  5/2012 Stern et al.
(Continued)

FOREIGN PATENT DOCUMENTS

CN  101765225  6/2010
JP  2007183747  7/2007
(Continued)

OTHER PUBLICATIONS

Clark et al., "Live Migration of Virtual Machines," *Proceedings of the 2nd Usenix Symposium on Networked Systems Design and Implementation (NSDI '05)*, Boston, MA (May 2-4, 2005), pp. 273-286.
(Continued)

*Primary Examiner* — Eric C Wai
*Assistant Examiner* — Jorge A Chu Joy-Davila
(74) *Attorney, Agent, or Firm* — Kilpatrick Townsend & Stockton LLP

(57) ABSTRACT

Virtual machines may migrate between heterogeneous sets of implementation resources in a manner that allows the virtual machines to efficiently and effectively adapt to new implementation resources. Furthermore, virtual machines may change types during migration without terminating the virtual machines. Migration templates may be established to manage migration of sets of virtual machines between sets of implementation resources and/or virtual machine types. Migration templates may be established based at least in part on information provided by migration agents added to the virtual machines under consideration for migration. The migration agents may detect and augment relevant virtual machine capabilities, as well as trigger reconfiguration of virtual machine components in accordance with migration templates.

20 Claims, 11 Drawing Sheets

(51) Int. Cl.
*G06F 3/06* (2006.01)
*G06F 9/50* (2006.01)

(52) U.S. Cl.
CPC .... *G06F 9/5088* (2013.01); *G06F 2009/4557* (2013.01); *G06F 2009/45595* (2013.01); *G06F 2201/865* (2013.01); *G06F 2212/151* (2013.01)

(58) Field of Classification Search
CPC ... G06F 9/45558; G06F 9/4856; G06F 9/5088
See application file for complete search history.

(56) References Cited

U.S. PATENT DOCUMENTS

| | | | |
|---|---|---|---|
| 8,352,608 | B1 | 1/2013 | Keagy et al. |
| 8,364,802 | B1 | 1/2013 | Keagy et al. |
| 8,458,717 | B1 | 6/2013 | Keagy et al. |
| 8,484,653 | B2 | 7/2013 | Tsirkin |
| 9,102,625 | B2 | 8/2015 | Bauer et al. |
| 9,329,886 | B2 | 5/2016 | Vincent |
| 2002/0129126 | A1 | 9/2002 | Chu et al. |
| 2006/0089995 | A1* | 4/2006 | Kerr .................. G06F 9/4856 709/227 |
| 2007/0180436 | A1 | 8/2007 | Travostino et al. |
| 2008/0040526 | A1 | 2/2008 | Suzuki et al. |
| 2008/0134175 | A1 | 6/2008 | Fitzgerald et al. |
| 2009/0228629 | A1 | 9/2009 | Gebhart et al. |
| 2010/0115512 | A1 | 5/2010 | Sakai et al. |
| 2010/0131728 | A1* | 5/2010 | Miyamae .............. G06F 3/0605 711/162 |
| 2010/0175063 | A1 | 7/2010 | Ciano et al. |
| 2010/0242045 | A1 | 9/2010 | Swamy et al. |
| 2010/0306381 | A1 | 12/2010 | Lublin et al. |
| 2010/0306486 | A1 | 12/2010 | Balasubramanian et al. |
| 2010/0306773 | A1 | 12/2010 | Lee et al. |
| 2011/0231839 | A1 | 9/2011 | Bennett et al. |
| 2012/0144042 | A1 | 6/2012 | Lublin et al. |

FOREIGN PATENT DOCUMENTS

| | | |
|---|---|---|
| JP | 2008217302 | 9/2008 |
| JP | 2010033292 | 2/2010 |

OTHER PUBLICATIONS

Convert virtual machines Retrieved from the with VMware Converter. [online] Dedoimedo, Apr. 29, 2009. [retrieved on Mar. 23, 2017] Retrieved from the Internet dedoimedo.com/computers/vmw_are-converter.html 11 pages.
EP11846689.5 , "Extended European Search Report", dated Mar. 31, 2017, 11 pages.
Migliardi et al., "Dynamic Reconfiguration and Virtual Machine Management in the Harness Metacomputing System", *Network and Parallel Computing*, Springer International Publishing (1998), pp. 127-134.
Verma et al., "The cost of reconfiguration in a cloud", *Proceedings of the 11th International Middleware Conference Industrial Track*, New York, NY (Nov. 29, 2010), pp. 11-16.
Convert virtual machines with VMware converter. *Dedoimedo*, Apr. 29, 2009, pp. 1-9.
U.S. Appl. No. 12/965,723 , "Final Office Action", dated Feb. 14, 2014, 36 pages.
U.S. Appl. No. 12/965,723 , "Non Final Office Action", dated Aug. 14, 2013, 27 pages.
U.S. Appl. No. 12/965,723 , "Non-Final Office Action", dated Aug. 27, 2015, 54 pages.
U.S. Appl. No. 12/965,723 , "Notice of Allowance", dated Jan. 6, 2016, 24 pages.
CA2,817,760 , "Office Action", dated Jan. 27, 2015, 3 pages.
CA2,817,760 , "Office Action", dated Dec. 21, 2015, 5 pages.
Clark et al., "Live Migration of Virtual Machines", NSDI 2005: 2nd Symposium on Networked Systems Design & Implementation, 2005, pp. 273-286.
CN201180058425.2 , "Office Action", dated Aug. 18, 2015, 31 pages.
JP2013-542215 , "Notice of Allowance", dated Sep. 2, 2014, 3 pages.
JP2013-542215 , "Notice of Rejection,", dated May 13, 2014.
JP2014-204302 , "Notice of Allowance", dated Aug. 9, 2016, 6 pages.
JP2014-204302 , "Office Action", dated Jan. 5, 2016, 3 pages.
PCT/US2011/063108 , "International Search Report and Written Opinion", dated Apr. 4, 2012, 11 pages.
SG201303652-0 , "Examination Report", dated Oct. 11, 2013, 5 pages.
EP11846689.5 , "Office Action", dated Feb. 1, 2018, 7 pages.

* cited by examiner

VIRTUAL MACHINE MORPHING FOR HETEROGENEOUS MIGRATION ENVIRONMENTS

CROSS REFERENCE TO RELATED APPLICATIONS

This application is a continuation of U.S. application Ser. No. 12/965,723, Filed Dec. 10, 2010, and entitled "VIRTUAL MACHINE MORPHING FOR HETEROGENEOUS MIGRATION ENVIRONMENTS," the contents of which are herein incorporated by reference in its entirety.

BACKGROUND

It has become common for individuals and organizations to use networked computers to perform and assist with a wide variety of tasks. Rather than own and maintain physical computer hardware and a suitable data networking environment, it is becoming more and more common to provision virtual computer systems at a specialized provider of such virtual systems. Use of virtual computer systems can provide a number of advantages including cost advantages and/or ability to adapt rapidly to changing computing resource needs. However, conventional virtual computer system provisioning has a number of shortcomings.

Virtual computer systems are ultimately implemented with physical computing hardware and other implementation resources. Nevertheless, a virtual computer system may have an existence, and a configuration, that is independent of the underlying implementation resources. It is not uncommon for particular implementation resources, and even entire implementation resource sets, to be replaced without terminating the virtual computer systems they implement. In this way, virtual computer systems can have relatively long lifetimes. However, as such lifetimes grow longer, various issues can arise with respect to the underlying implementation resources.

The implementation resources used by a particular virtual computer system provider can be changed for a variety of reasons including to enhance technical and/or cost performance. For example, technical advances by a hardware manufacturer may enable more efficient implementation of virtual computer systems. However, implementation resource changes may be incompatible with unchanged virtual computer systems, or virtual computer systems may require reconfiguration to take full advantage of new implementation resources. Insufficiently powerful and/or flexible mechanisms for adapting relatively long-lived virtual computer systems to changed implementation resources can leave the virtual computer systems unusable or operating at an unacceptable level of efficiency.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
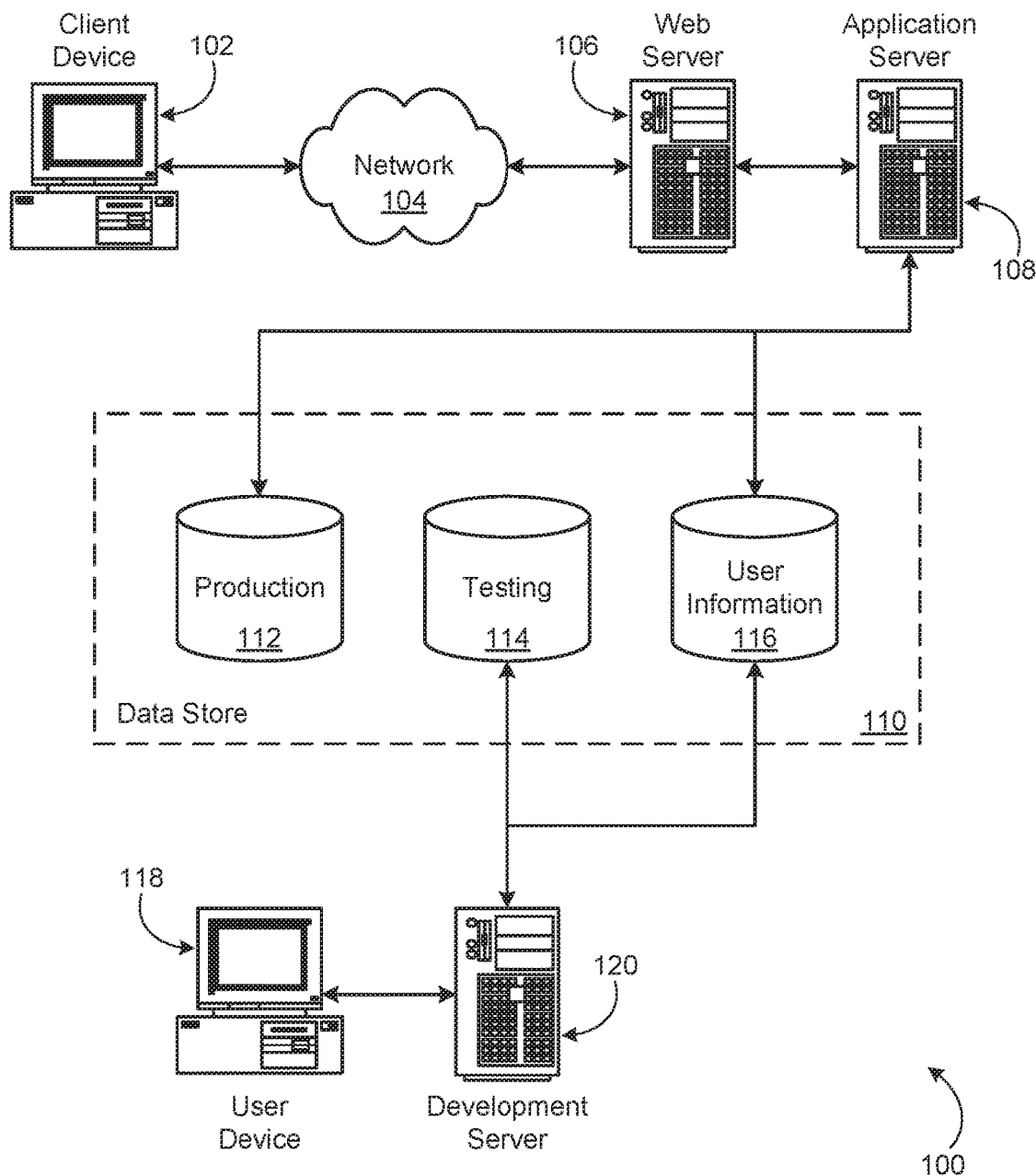
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A virtual resource provider may provision various virtual resources (i.e., emulated computing resources) such as virtual computing machines ("virtual machines") of various types with various sets of physical computing hardware and other implementation resources. For example, physical virtual machine (VM) servers may maintain multiple virtual machines, with different types of virtual machine requiring different portions of VM server resources. Virtual machines may migrate between (i.e., be consecutively implemented by) different (e.g., heterogeneous) sets of implementation resources in a manner that allows the virtual machines to efficiently and effectively adapt to new implementation resources. For example, a virtual machine may migrate from an aging VM server to a new VM server while optimally adapting to changes in processing unit (e.g., central processing unit) type or number, memory module type or number, and/or hard drive type or number. Furthermore, virtual machines may change type ("morph") without terminating. For example, a new VM server may not support the current type of a particular virtual machine, and the virtual machine may morph to a supported type as part of migrating to the new VM server. In at least one embodiment, virtual machine morphing is independent of virtual machine migration. For example, a set of virtual machines may morph from a first type of virtual machine to a second type of virtual machine without changing the set of implementation resources used to implement the set of virtual machines.

The migration of a first type of virtual machine to a second type of virtual machine may be performed in accordance with a migration template for the two types. The migration template may specify one or more virtual machine, virtualization layer and/or implementation resource reconfigurations to be performed prior to, during and/or following migration of the virtual machine. An administrator and/or other authorized user (collectively, "administrator") of the virtual machine may utilize a user interface (e.g., a Web-based, programmatic and/or graphical user interface) to establish the migration template. The migration template may be specified at least in part by user selection of a set of presented migration options. Alternatively, or in addition, the migration template may be specified based at least in part on a configuration of the virtual machine to be migrated.

When authorized, a migration agent may be added to virtual machines selected for migration. The migration agent may be adapted to a particular type of virtual machine and/or components thereof. For example, migration agent types may correspond to types of operating system maintained by virtual machines. The migration agent may be configured to detect the presence of any suitable virtual machine capability. In addition, the migration agent may be configured to augment the capabilities of particular virtual machines for the purposes of migration. Detected and/or augmented capabilities of virtual machines may be reported to a migration template editor, and corresponding migration templates based at least in part on such reports. In addition to capability detection, a migration manager may interact with the migration agent to trigger virtual machine reconfigurations of various types, including custom reconfigurations specified by the administrator.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
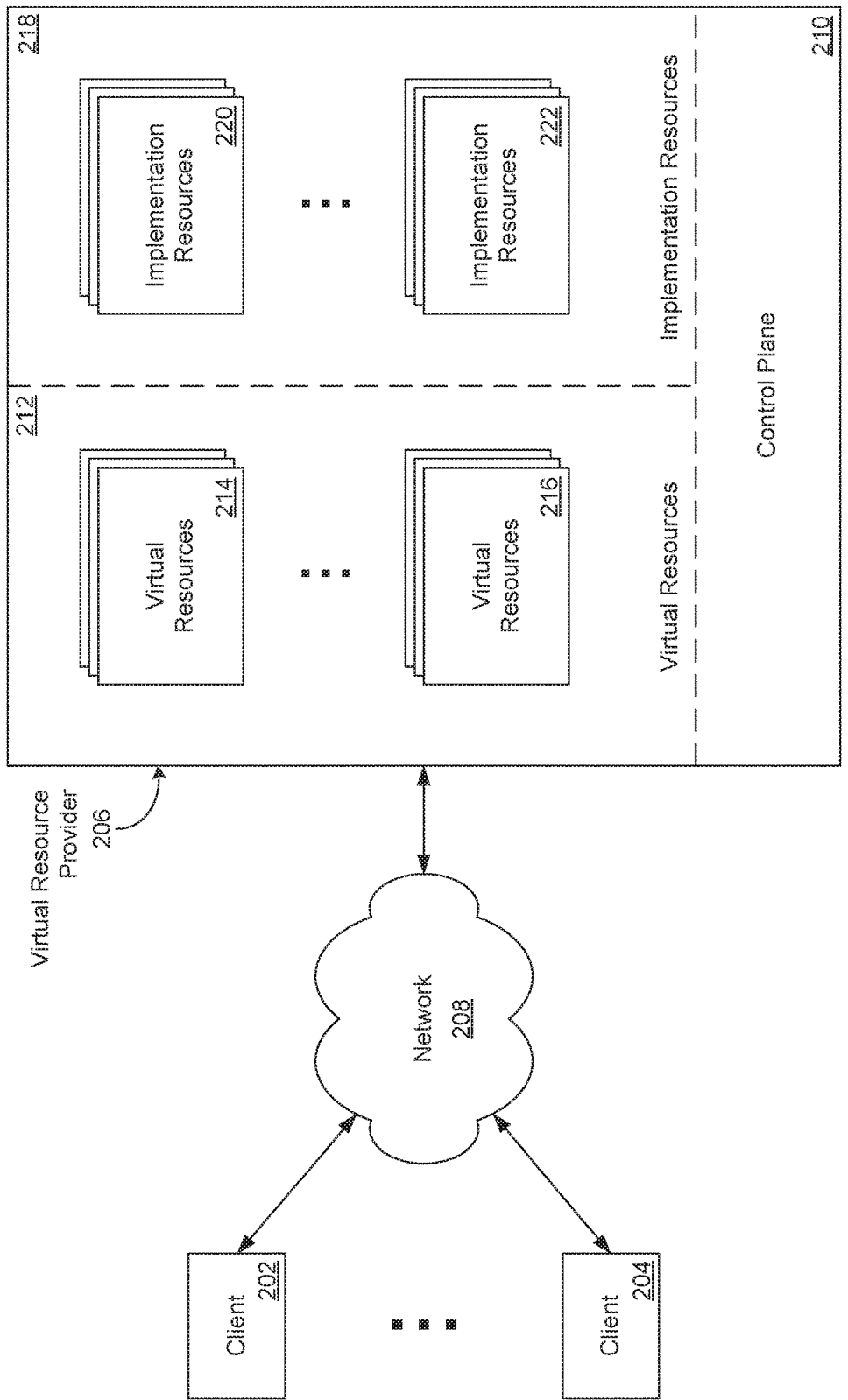
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual resource provisioning architecture 200 may include any suitable number of clients although, for clarity, only two are shown in FIG. 2. Ellipses are used similarly throughout the drawings.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable type and/or number of virtual resources 214-216. Examples of suitable virtual resources 212 include virtual machines such as virtual computer systems, virtual network connections, virtual data stores, specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable type and/or number of implementation resources 220-222. Each of the virtual resources 214-216 may be implemented by a set of the implementation resources 218. In at least one embodiment, various implementation resources of the implementation resources 218 may be configured to participate in implementing, at least in part, multiple virtual resources of the virtual resources 212. Examples of suitable implementation resources 220-222 include VM servers, data store servers, computers, server racks, networking hardware including switches, routers, gateways, bridges, hubs, repeaters, firewalls, and wireless transceivers, power supplies, generators, data centers, rooms in data centers, mobile data centers, as well as non-volatile storage devices including hard drives, processing units such as central processing units (CPUs), caches in processing units, processing cores in multi-core processing units, volatile storage devices such as memory modules including random access memory (RAM) modules, and RAM chips of multi-chip memory modules, network interface hardware and suitable combinations thereof. The control plane 210 may process virtual resource provisioning requests, manage allocation of virtual resources 212 to implementation resources 218 and/or manage allocation of implementation resources 218 to virtual resources 212. An example virtual resource provider control plane in accordance with at least one embodiment is described below in more detail with reference to FIG. 4.

Figure 3:
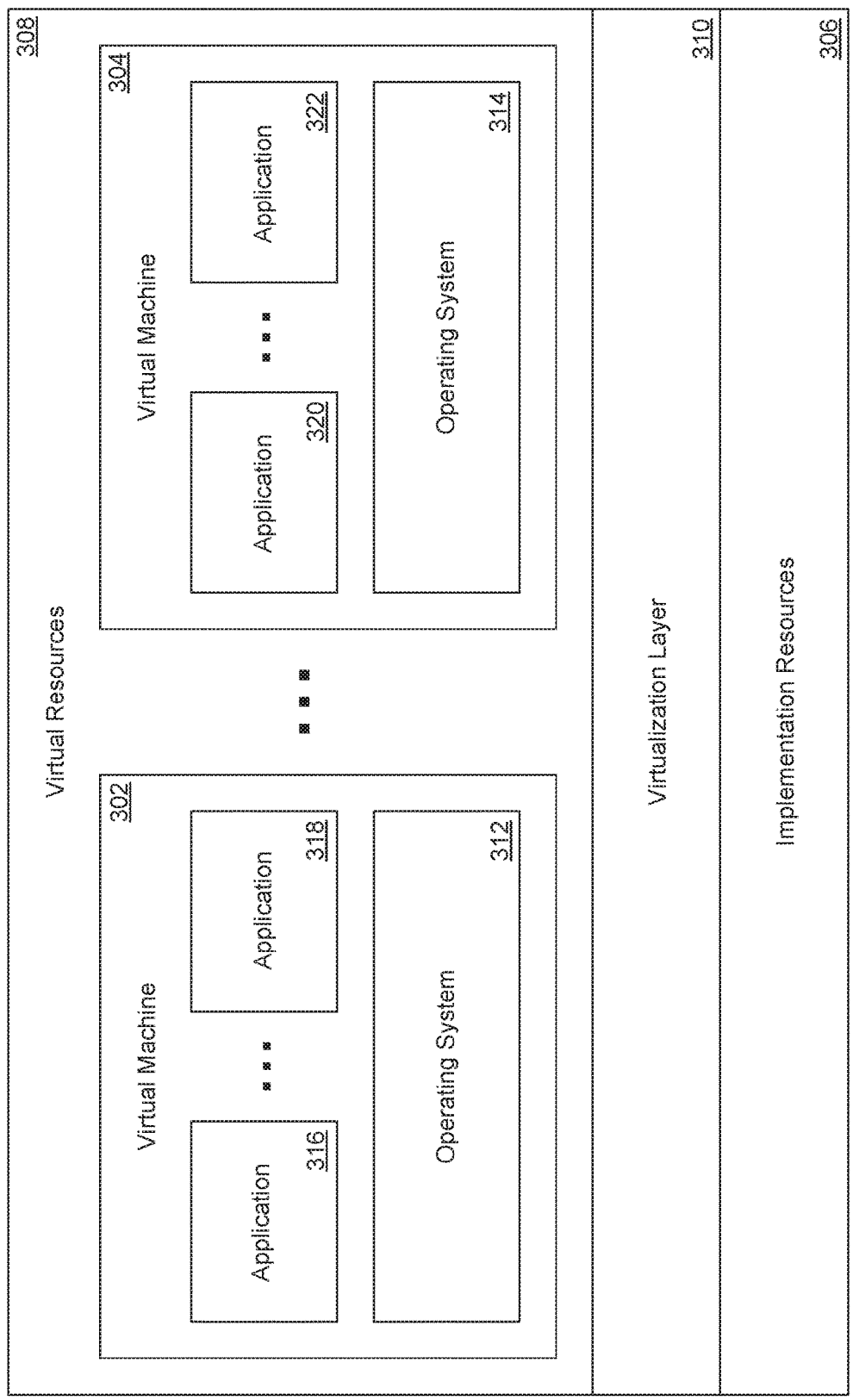
FIG. 3 is a schematic diagram depicting aspects of an example virtual resource provider in accordance with at least one embodiment.

Virtual machines may provide some or all of the functionality of a physical computer system, particular with respect to remotely accessible computer system functionality. FIG. 3 depicts aspects of example virtual machines 302-304 provisioned at a virtual resource provider 300 in accordance with at least one embodiment. The virtual resource provider 300 is an example of the virtual resource provider 206 of FIG. 2, and has corresponding implementation resources 306 and virtual resources 308 including the virtual machines 302-304. In FIG. 3, a virtualization layer 310 is explicitly shown lying between the implementation resources 306 and the virtual resource 308. The virtualization layer 310 may decouple the virtual machines 302-304 from the underlying implementation resources 306 and/or partition the virtual machines 302-304 from one another even when they share particular implementation resources. For example, the virtualization layer 310 may incorporate a so-called "hypervisor" executed by a VM server of the implementation resources 306. Such hypervisors and virtualization layers are known in the art, so only some of their details are described herein.

Each virtual machine 302, 304 is shown as including an operating system 312, 314 and multiple applications 316-318, 320-322, respectively. The virtual machines 302-304 may include any suitable computer operating system (e.g., a UNIX operating system), and different virtual machines 302, 304 may include different operating systems 312, 314 and/or different operating system versions and configurations. Each virtual machine 302, 304 may include multiple operating systems, although this is not shown in FIG. 3 for clarity. The applications 316-322 may be any suitable computer application including any suitable computer-executable instructions. The applications 316-322 may provide any suitable service to a user of the virtual machine including a service corresponding to those provided by the Web server 106, the application server 108, the development server 120 and/or the data store 110 of FIG. 1. Virtual machines 302-304 need not have applications 316-322 separate from the operating systems 312-314.

Figure 4:
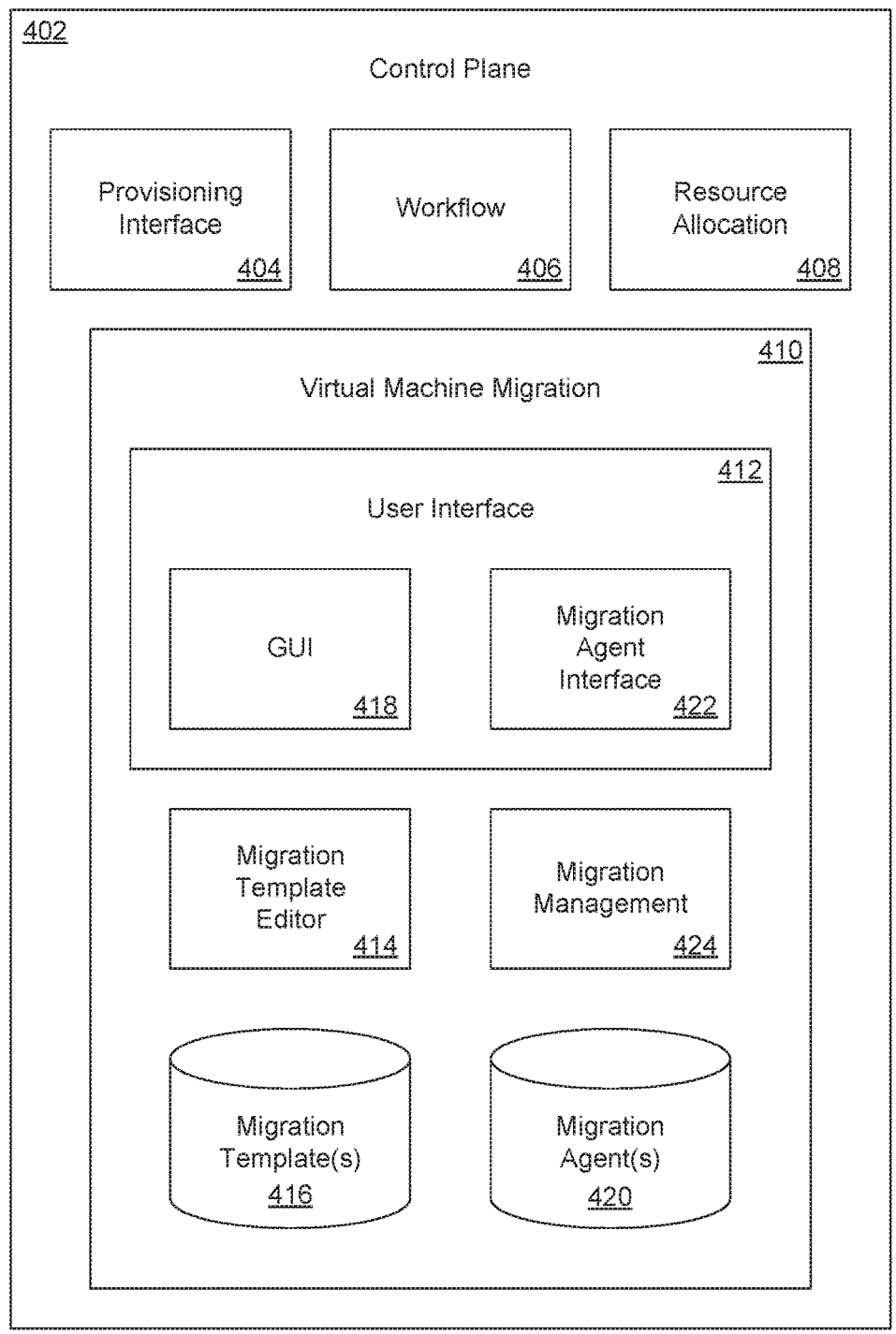
FIG. 4 is a schematic diagram depicting aspects of an example virtual resource provider control plane in accordance with at least one embodiment.

Provisioning, configuration, re-configuration, and/or de-provisioning (collectively, "provisioning") of the virtual resources 308 including the virtual machines 302-304 may be controlled by the control plane 210 (FIG. 2) of the virtual resource provider 206. FIG. 4 depicts aspects of an example control plane 402 in accordance with at least one embodiment. The control plane 402 of FIG. 4 is an example of the control plane 210 of FIG. 2. The control plane 402 may include a provisioning interface 404 configured at least to receive virtual resource 212 provisioning requests from one or more of the clients 202-204, a workflow component 406 configured at least to guide responses to provisioning requests in accordance with one or more provisioning workflows, and a resource allocation component 408 configured at least to manage allocation of implementation resources 218 to virtual resources 212.

The provisioning interface 404 may include any suitable provisioning interface elements. Examples of suitable provisioning interface elements include interface elements that correspond to requests to provision the virtual resources 212 (FIG. 2), interface elements that provide access to virtual resource 212 configuration information, and one or more interface elements enabling authentication to establish authority for such provisioning-related operations. The provisioning interface 404 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the provisioning interface 404 correspond to messages of a communication protocol, and/or any suitable combination thereof.

In at least one embodiment, the provisioning interface 404 and the resource allocation component 408 may create, and/or cause the workflow component 406 to create, one or more workflows that are then maintained by the workflow component 406. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the resource allocation component 408.

The workflow component 406 may modify, further specify and/or further configure established workflows. For example, the workflow component 406 may select particular implementation resources 218 (FIG. 2) of the virtual resource provider 206 to execute and/or be assigned to particular tasks. Such selection may be based at least in part on the computing resource needs of the particular task as assessed by the workflow component 406. As another example, the workflow component 406 may add additional and/or duplicate tasks to an established workflow and/or reconfigure information flow between tasks in the established workflow. Such modification of established workflows may be based at least in part on an execution efficiency analysis by the workflow component 406. For example, some tasks may be efficiently performed in parallel, while other tasks depend on the successful completion of previous tasks.

As part of provisioning a virtual resource, the provisioning interface 404 and/or the workflow component 406 may request that the resource allocation component 408 determine the appropriate set of the implementation resources 218 (FIG. 2) required to implement the virtual resource, determine whether the required implementation resources are available and/or in accordance with virtual resource provider 206 allocation policies, and/or allocate the required implementation resources. The resource allocation component 408 may incorporate any suitable resource allocation and/or resource scheduling algorithm. Various aspects of such algorithms are well known to those of skill in art, so only some details are described herein.

The control plane 402 may further include a virtual machine migration component 410 configured at least to migrate virtual machines 302-304 (FIG. 3) between different sets of implementation resources 306. The virtual machine migration component 410 may include a user interface 412 with which clients 202-204 (FIG. 2) may interact to specify and request virtual machine migrations. The user interface 412 may provide access to a migration template editor 414 configured at least to enable users to create, read, update and delete (collectively, "edit") one or more migration templates 416. For example, the user interface 412 may include a graphical user interface (GUI) 418 configured at least to enable authorize users to edit the migration template(s) 416. An example of a migration template in accordance with at least one embodiment is described below in more detail with reference to FIG. 6.

The user interface 412 may further enable users to request a set of migration options for a specified set of virtual machines 302-304 (FIG. 3). For example, the specified set of virtual machines 302-304 may include one or more particular types and/or configurations of virtual machine, and the migration options may be constrained by the particular types and/or configurations. Responsive to the request and/or to an explicit authorization, the virtual machine migration component 410 may add one or more migration agents 420 to one or more of the specified set of virtual machines 302-304, and the added migration agent(s) 420 may determine and/or provide information characterizing the particular types and/or configurations of the virtual machines to which they have been added. An example of a migration agent in accordance with at least one embodiment is described below in more detail with reference to FIG. 5.

The migration agent(s) 420 added to the virtual machine 302 (FIG. 3) may provide information characterizing the virtual machine 302 back to the virtual machine migration component 410 through a migration agent interface 422. Alternatively, or in addition, any suitable agent (e.g., a customer user agent) may provide the characterizing information through the migration agent interface 422. The information characterizing the virtual machine 302 may be any information suitable for determining necessary and/or desirable actions to transform and/or reconfigure the virtual machine to effectively and/or efficiently migrate the virtual machine. Examples of such characterizing information include a number of physical processing units allocated to the virtual machine, a number of processing cores allocated to the virtual machine, one or more types of physical processing unit allocated to the virtual machine, a size and/or type of volatile data storage allocated to the virtual machine, a size and/or type of non-volatile data storage allocated to the virtual machine, and a number and/or type of networking resources including networking devices, such as network interface devices, that are allocated to the virtual machine. Further examples of such characterizing information include characteristics of one or more components of the operating system 312 of the virtual machine 302 such as whether the operating system 312 includes hot plug functionality with respect to particular implementation resources 306 such as physical processing units, processing cores, volatile storage devices such as memory modules and non-volatile storage devices such as hard drives.

The virtual machine migration component 412 may filter a set of available migration options (e.g., from VM type A to VM types B-Z) based on the characterizing information received at the migration agent interface 422 and/or the user interface 412 to determine a candidate set of migration options (e.g., from VM type A to VM types C, D and K), and the candidate set of migration options may be presented to the administrator for selection. When addition of the migration agent(s) 420 to virtual machines is not authorized, the virtual machine migration component 410 may use a conservative default set of charactering information as the filter, possibly resulting in a smaller candidate set. The administrator may resubmit the migration options request with additional such authorizations to attempt to generate a larger candidate set if desired. The migration options may correspond to migration template(s) 416. Alternatively, or in addition, selecting from among the presented candidate set of migration options may filter a set of available migration templates 416. As a further alternative, or further in addition, migration option selections may configure and/or specify one or more portions of the migration template(s) 416.

Once suitable migration options and/or migration templates 416 are available, the administrator may assign particular migration templates 416 to particular sets of virtual machines 302-304 (FIG. 3). A migration management component 424 may then migrate the sets of virtual machines 302-304 in accordance with the assigned migration templates 416. The migration template(s) 416 may specify one or more virtual machine 302-304, virtualization layer 310 and/or implementation resource 306 reconfigurations to be performed prior to, during and/or following migration of the corresponding virtual machine 302-304. When the specified reconfiguration is internal to a virtual machine 302-304, the migration management 424 and the virtual machine 302-304 has a suitable one of the migration agent(s) 420 added, the migration management component 424 may trigger the internal reconfiguration by interacting with the added migration agent(s) 420 through the migration agent interface 422.

Figure 5:
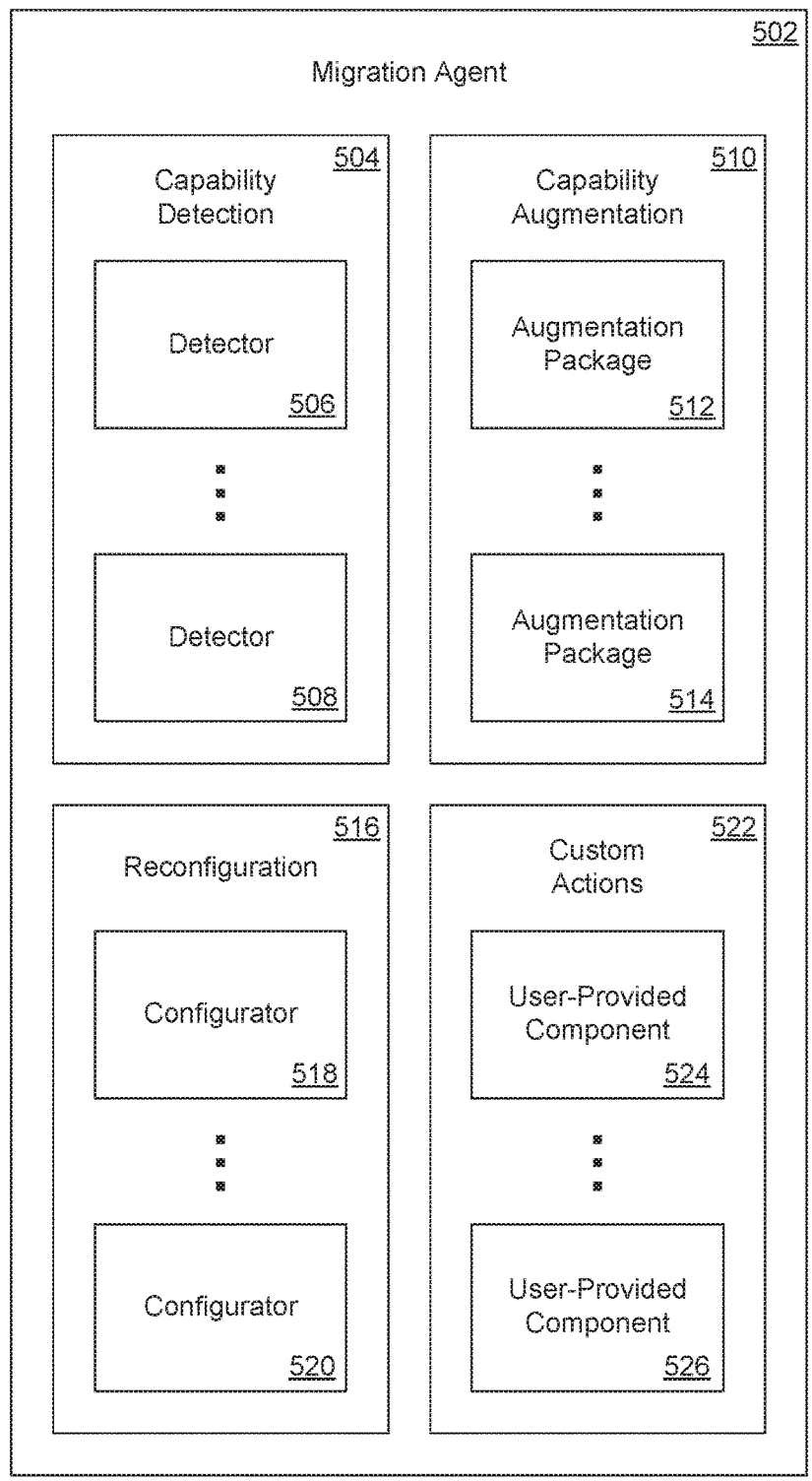
FIG. 5 is a schematic diagram depicting aspects of an example migration agent in accordance with at least one embodiment.

The migration agent(s) 420 may include instructions executable by the virtual machines 302-304 (FIG. 3) to perform one or more migration tasks. FIG. 5 depicts aspects of an example migration agent 502 in accordance with at least one embodiment. The migration agent 502 is an example of the migration agent(s) 420 of FIG. 4. The migration agent 502 may include a capability detection component 504. The capability detection component 504 may detect one or more virtual machine 302-304 capabilities. For example, the capability detection component 504 may detect whether the operating system 312 includes hot plug functionality with respect to particular implementation resources 306. The capability detection component 504 may include one or more detectors 506-508 configured at least to detect a particular capability of a particular type of virtual machine. For example, the capability detection component 504 may select a particular set of detectors 506-508 based at least in part on a detected type and/or version of the operating system 312 of the virtual machine 302 to which the migration agent 502 is added.

The capability detection component 504 may detect that a particular virtual machine 302 (FIG. 3) does not have a particular capability with respect to migration. In such a case, a capability augmentation component 510 may, when authorized, temporarily or permanently augment the capability of the virtual machine 302. For example, the capability augmentation component 510 may augment the operating system 312 of the virtual machine 302 to include hot plug functionality with respect to particular implementation resources 306 such as physical processing units, processing cores, volatile storage devices such as memory modules and non-volatile storage devices such as hard drives. The capability augmentation component 510 may include one or more augmentation packages 512-514 to be deployed to the virtual machine 302. For example, the augmentation packages 512-514 may correspond to particular packages of augmentation functionality and/or particular virtual machine 302 component types and/or versions such as operating system 312 type and/or version.

Once added to the virtual machine 302 (FIG. 3), the migration agent 502 can play a role beyond that of capability detection and augmentation. The migration agent 502 may further include a reconfiguration component 516 configured at least to reconfigure the virtual machine 302 as instructed by the migration management component 424 (FIG. 4) in accordance with one or more of the migration template(s) 416. Since the migration agent 502 is migrated to the new implementation resource set along with the virtual machine 302, the reconfiguration component 516 may reconfigure the virtual machine 302 both pre and post migration. For example, suppose the migration will morph the virtual machine 302 from a first type to a second type that is allocated fewer physical processors. The reconfiguration component 516 may reconfigure the virtual machine 302 to access fewer physical processors in preparation for the migration. As another example, suppose the migration morphs the virtual machine 302 from the first type to a second type that has a larger non-volatile data storage allocation. Following the migration, the reconfiguration component 516 may resize a file system or logical data storage volume to take advantage of the larger allocation. The reconfiguration component 516 may include one or more configurators 518-520 adapted for the virtual machine 302 to which the migration agent is added. For example, the configurators 518-520 may be adapted to particular virtual machine 302 component types and/or versions such as operating system 312 type and/or version.

While many operating systems 312-314 (FIG. 3) and applications 316-322 are standardized, virtual machines 302-304 may include custom applications and operating systems, and even standardized applications may be configured to manage data structures with non-standard characteristics. Accordingly, the migration agent 502 may include a custom actions component 522 configured at least to activate one or more user-provided components 524-526 as instructed by the migration management component 424 (FIG. 4) in accordance with one or more of the migration template(s) 416. For example, the administrator may provide one or more of the components 524-526 during creation of the migration template(s) 416. The user-provided components 524-526 may include instructions executable by the virtual machine 302 in any suitable programming language including interpreted programming languages and/or scripting languages. For example, the user-provided components 524-526 may perform application-level reconfiguration responsive to increases and/or decreases in allocated implementation resources 306.

Figure 6:
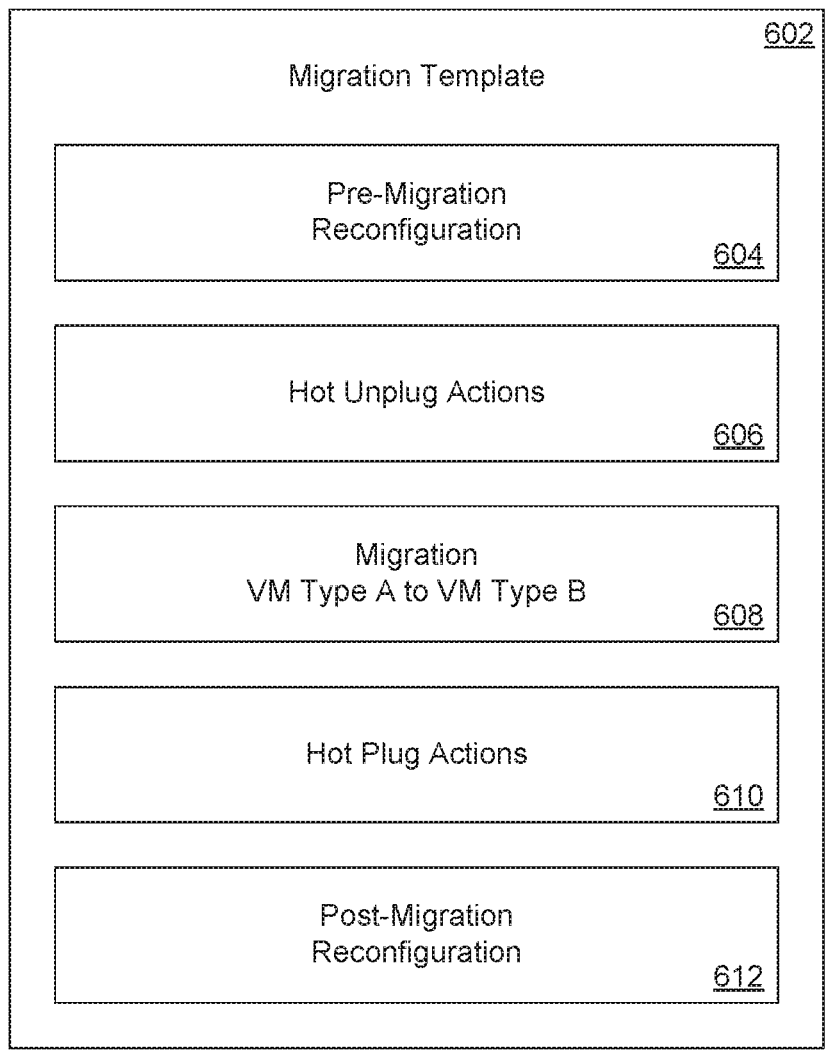
FIG. 6 is a schematic diagram depicting aspects of an example migration template in accordance with at least one embodiment.

The activities of the migration agent 502 may be controlled by the migration management component 424 (FIG. 4) in accordance with one or more of the migration template(s) 416. FIG. 6 depicts aspects of an example migration template 602 in accordance with at least one embodiment. The migration template 602 may specify one or more tasks suitable for establishing a virtual machine migration workflow to be managed by the workflow component 406 of the control plane 402. The tasks specified by the migration template 602 may include pre-migration reconfiguration tasks 604, hot unplug actions 606, one or more migration tasks 608, hot plug actions 610 and post-migration reconfiguration tasks 612.

The hot unplug actions 606 may include one or more tasks corresponding to removal of one or more of the implementation resources 306 (FIG. 3) currently available to the virtual machine 302. For example, the hot unplug actions 606 may include decreasing the number of physical processing units and/or processing cores available to the virtual machine 302, decreasing the number of physical memory modules and/or allocated volatile data storage size available to the virtual machine 302, and decreasing the number of physical hard drives and/or allocated non-volatile data storage size available to the virtual machine 302. Such actions 606 may have effects corresponding to unplugging physical components from physical computer systems. Accordingly, some application-level and/or operating system level preparations may be desirable and/or necessary. The pre-migration reconfiguration tasks 604 portion of the migration template 602 may include one or more tasks to be performed in preparation for the hot unplug actions 606.

Similarly, the hot plug actions 610 may include one or more tasks corresponding to addition of one or more of the implementation resources 306 (FIG. 3) currently unavailable to the virtual machine 302. For example, the hot plug actions 610 may include increasing the number of physical processing units and/or processing cores available to the virtual machine 302, increasing the number of physical memory modules and/or allocated volatile data storage size available to the virtual machine 302, and increasing the number of physical hard drives and/or allocated non-volatile data storage size available to the virtual machine 302. Such actions 610 may have effects corresponding to plugging in physical components to physical computer systems. Accordingly, some application-level and/or operating system level reconfiguration may be desirable and/or necessary to take advantage of the additional implementation resources. The post-migration reconfiguration tasks 612 portion of the migration template 602 may include one or more tasks to be performed to adapt to the resources added by the hot plug actions 610.

The migration tasks 608 portion of the migration template 602 may specify one or more tasks required to migrate the virtual machine 302 (FIG. 3) from a first set of implementation resources to a second set of implementation resources and/or from a first type of virtual machine to a second type of virtual machine. The migration may be "live" in that the operation of the virtual machine 302 is uninterrupted or minimally interrupted (e.g., for less than a second). Alternatively, or in addition, the migration may be a "save and restore" migration involving a more significant interruption to virtual machine operation and/or involve a "reboot" of the virtual machine. Such migration and/or live migration techniques for virtual machines are known to those of skill in the art, so only some of the details are described herein. In at least one embodiment, the migration tasks 608 may specify one or more tasks to be performed during virtual machine 302 migration, for example, to transform the type of the virtual machine 302. One or more of the portions 604-612 of the migration template 602 may be empty. For example, the migration tasks 608 portion of the migration template 602 when the second set of implementation resources does not differ from the first set of implementation resources (e.g., the virtual machine 302 is to be morphed, but not migrated). In such a case, the migration template 602 may be called a morphing template.

Figure 7:
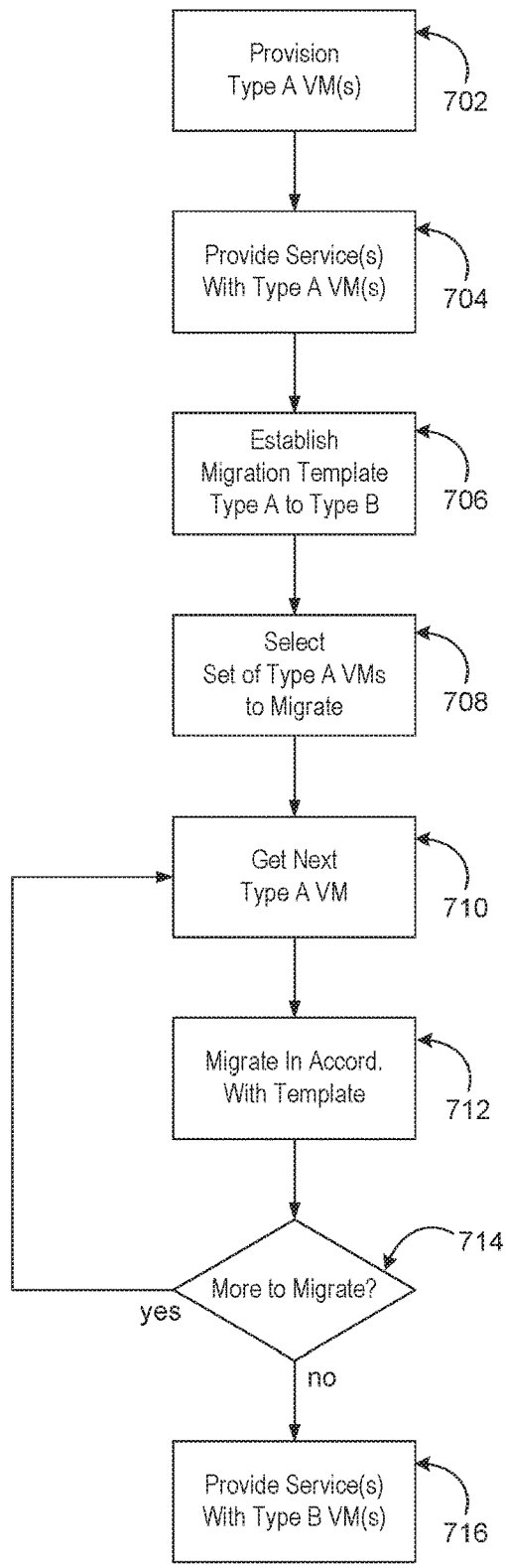
FIG. 7 is a flowchart depicting example steps for migrating a set of virtual machines in accordance with at least one embodiment.

The description now turns to example steps and/or procedures that may be performed in accordance with at least one embodiment. FIG. 7 depicts example steps for migrating a set of virtual machines in accordance with at least one embodiment. At step 702, one or more virtual machines of a first type ("Type A") may be provisioned. For example, the virtual machines 302-304 (FIG. 3) may be provisioned with the provisioning interface 404 (FIG. 4) of the control plane 402. At step 704, one or more services may be provided with the virtual machine(s) provisioned at step 702. For example, the virtual machine 302 may maintain the application 316 that provides a Web-based service.

The provisioned virtual machine(s) may provide the service(s) for some time, after which a migration becomes desirable and/or necessary. At step 706, in order to facilitate the migration, a migration template suitable for migrating the provisioned virtual machine(s) may be established. For example, one of the migration template(s) 416 (FIG. 4) may be established with the graphical user interface 418. In this example, the migration involves a transformation of the virtual machines from the first type of virtual machine to a second type of virtual machine ("Type B"). At step 708, a set of the provisioned virtual machines may be selected for migration. For example, the set of virtual machines may be selected with the graphical user interface 418 of the virtual machine migration component 410 and associated with the migration template established at step 706.

At step 710, a next (e.g., a first) of the specified set of virtual machines may be selected for migration. At step 712, the selected virtual machine may be migrated in accordance with the migration template established at step 706. For example, the migration management component 424 may trigger and/or perform the migration in accordance with the associated migration template. Alternatively, or in addition, the migration management component 424 may co-operate with the workflow component 406 to accomplish the virtual machine migration. The migration workflow may be based at least in part on the associated migration template. At step 714, it may be determined whether there are more virtual machines in the specified set to be migrated. If so a procedure incorporating step 714 may progress to step 710 to select the next of the set of virtual machines for migration. If not, the procedure may progress to step 716. At step 716, the migrated and transformed virtual machine(s) may continue to provide the service(s) of step 704.

Figure 8:
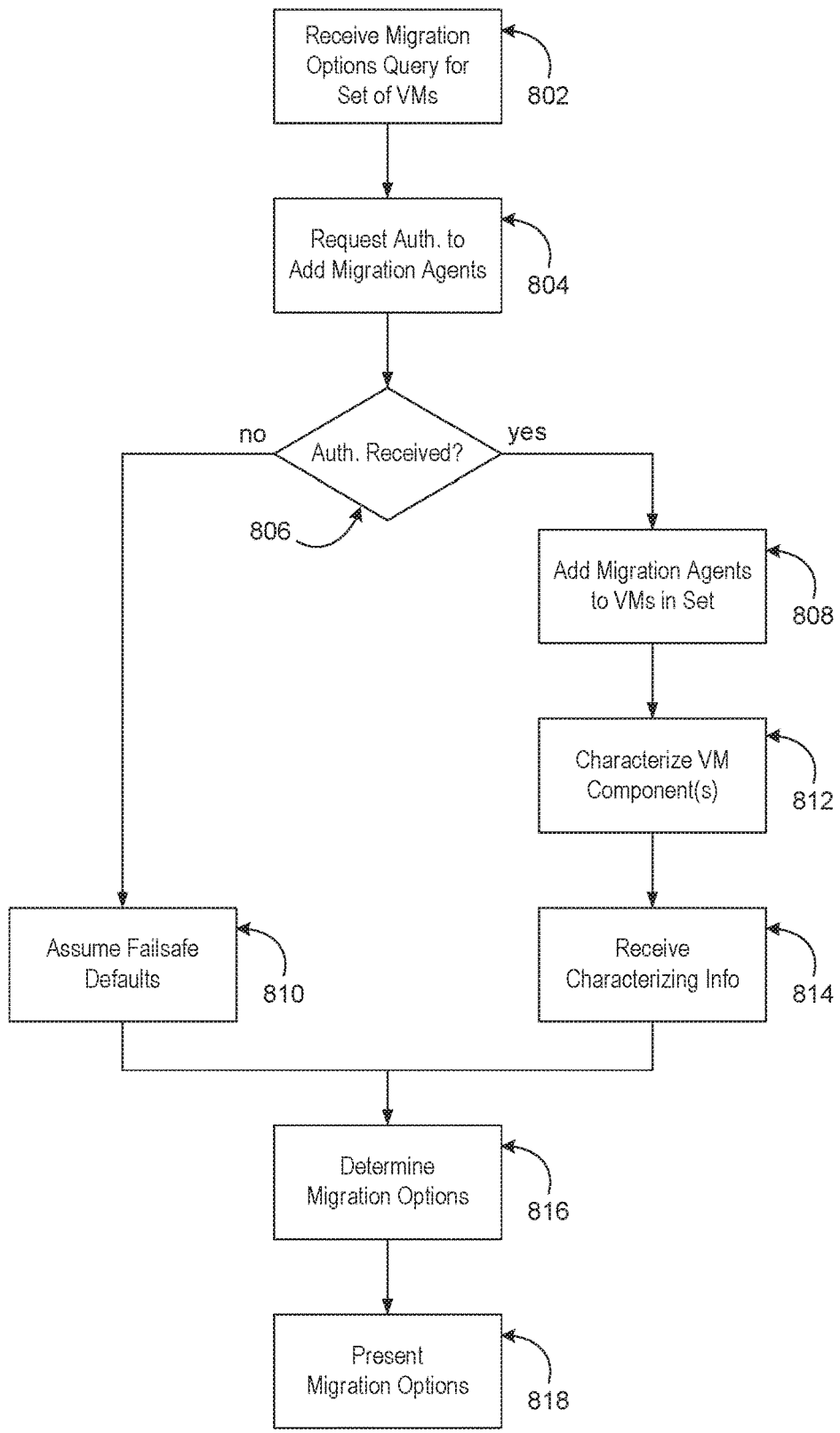
FIG. 8 is a flowchart depicting example steps for processing a migration options query in accordance with at least one embodiment.

Establishing the migration template 602 (FIG. 6) can be a complex process. The virtual machine migration component 410 (FIG. 4) may provide tools to assist the administrator in establishing the migration template 602. FIG. 8 depicts example steps for processing a migration options query in accordance with at least one embodiment. At step 802, the migration options query may be received. For example, the query may be received by the graphical user interface 418 of the virtual machine migration component 410. The query may be associated with a particular set of virtual machines for which the administrator is considering migration options. At step 804, authorization to add one or more migration agents to the set of virtual machines may be requested. For example, the graphical user interface 418 may request the authorization from the administrator placing the query of step 802.

At step 806, it may be determined whether the requested authorization has been received. For example, the administrator may provide a set of cryptographic credentials authorizing the addition. If the authorization is received, a procedure incorporating step 806 may progress to step 808. Otherwise, the procedure may progress to step 810.

At step 808, a suitable set of migration agents may be added to the set of virtual machines. For example, the virtual machine migration component 410 (FIG. 4) may add suitable migration agent(s) 420 to the virtual machine 302 (FIG. 3). The particular migration agent selected for addition to a particular virtual machine may be selected for compatibility with the virtual machine, for example, compatibility with an operating system of the virtual machine. Alternatively, the migration agent(s) 420 may incorporate components compatible with each available type of virtual machine 302-304 and/or be capable of configuring itself with such components so as to become compatible. At step 812, the added migration agents may characterize the set of virtual machines and/or the components thereof, for example, with the capability detection component 504 of the migration agent 502 (FIG. 5). At step 814, the characterizing information may be received. For example, the added migration agents may provide the characterizing information with the migration agent interface 422 of the virtual machine migration component 410.

If authorization is not received to add the migration agents to the set of virtual machines to ascertain the characterizing information of step 814 then, at step 810, a set of "failsafe" defaults may be identified in place of the characterizing information. The defaults may be failsafe in the sense that they will preclude migration options that may cause migration to fail due to virtual machine type and/or implementation resource incompatibility. At step 816, a set of migration options may be determined based on the characterizing information received at step 814 or the failsafe defaults of step 810. For example, the virtual machine migration component 410 (FIG. 4) may determine the set of migration options. At step 818, the set of migration options may be presented, for example, to the administrator that submitted the query of step 802 with the graphical user interface 418.

Figure 9:
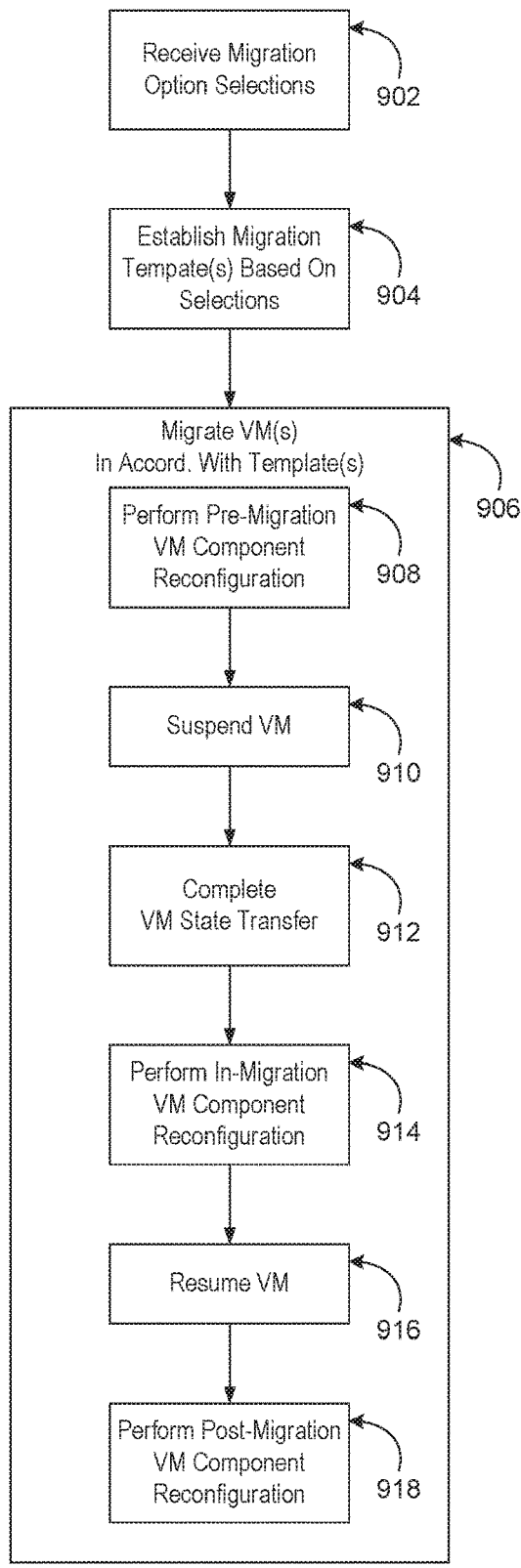
FIG. 9 is a flowchart depicting example steps for processing migration option selections in accordance with at least one embodiment.

The set of migration options may include migration template 602 (FIG. 6) configuration options such as which augmentation packages 512-514 (FIG. 5) to deploy (if any), whether to emulate incompatible implementation resources (potentially increasing the number of destination VM types), whether to "expose" compatible but different implementation resources post-migration (or "hide" the new implementation resources as their pre-migration types), as well as the set of candidate destination VM types. FIG. 9 depicts example steps for processing migration option selections in accordance with at least one embodiment. At step 902, the migration option selections may be received. For example, the virtual machine migration component 410 (FIG. 4) may receive the selections from the administrator through the graphical user interface 418. At step 904, one or more migration templates may be established based at least in part on the received migration option selections. For example, the migration template editor 414 may establish and/or configure the migration template(s) 416 based on the received migration option selections.

At step 906, selected virtual machines may be migrated in accordance with the established migration templates, for example, as described above with reference to FIG. 7. The migration of step 906 may itself include multiple steps. For example, suppose the virtual machine 302 of FIG. 3 is to be migrated in accordance with the migration template 602 of FIG. 6. At step 908, pre-migration reconfiguration of one or more components of the virtual machine 302 may be performed. For example, the pre-migration reconfiguration tasks 604 and hot unplug actions 606 may be performed. At step 910, the virtual machine 302 may be suspended in order to complete state transfer (step 912). Before resuming the virtual machine 302 (step 916), in-migration (or mid-migration) reconfiguration of one or more components of the virtual machine may be performed. For example, applications 316-318 may be re-linked to different operating system 312 components and/or a device re-discovery may be triggered at the operating system 312 level. At step 918, post-migration reconfiguration of one or more components of the virtual machine 302 may be performed. For example, the hot plug actions 610 and the post-migration reconfiguration tasks 612 may be performed as specified by the migration template 602.

Figure 10:
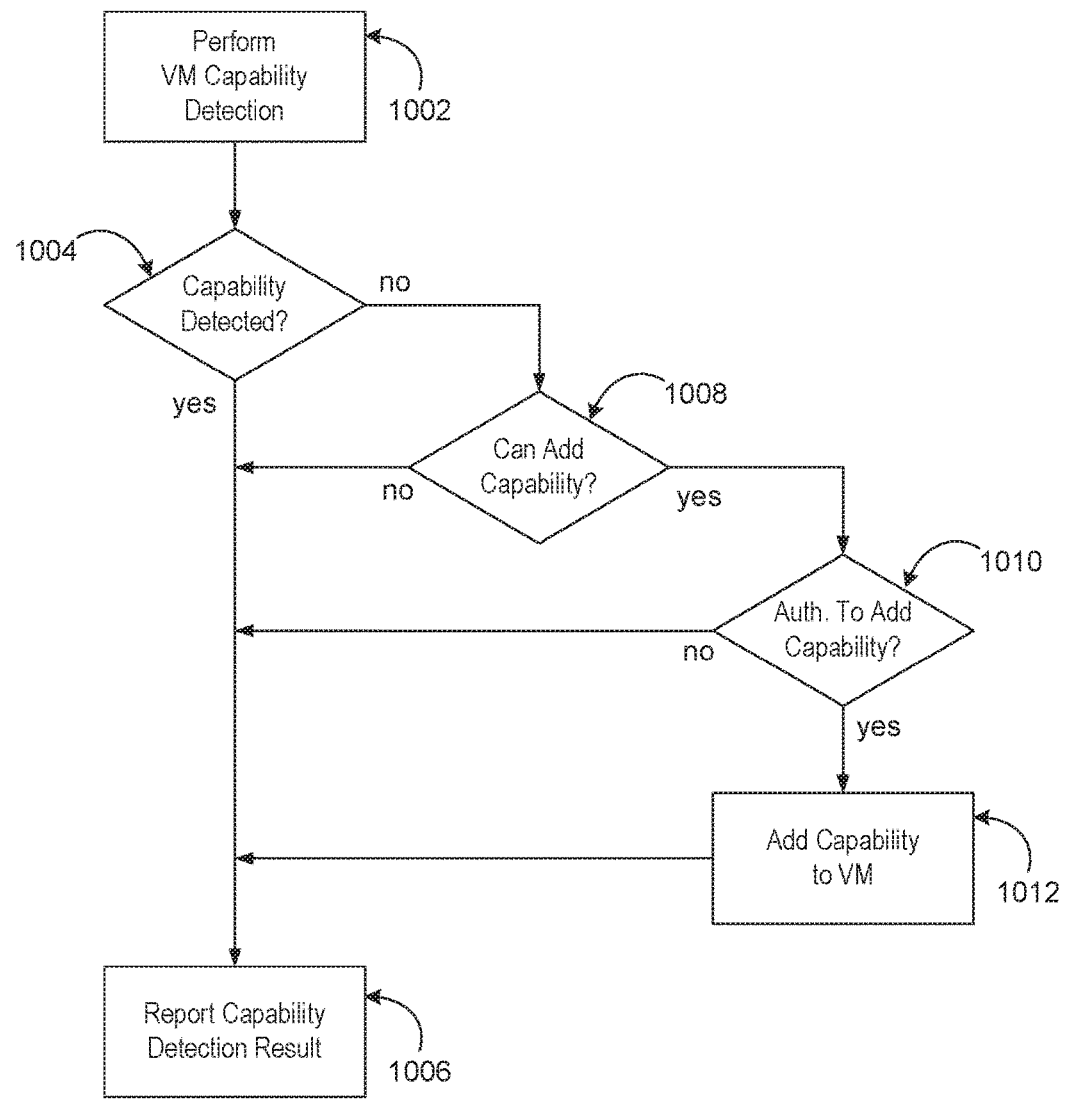
FIG. 10 is a flowchart depicting example steps for capability augmentation in accordance with at least one embodiment.

As described above with reference to FIG. 5, the migration agent 502 may include a capability augmentation component 510. FIG. 10 depicts example steps for capability augmentation in accordance with at least one embodiment. At step 1002, virtual machine capability detection may be performed, for example, by a particular detector 506 of the migration agent 502. At step 1004, it may be determined whether the capability was detected. If so, a procedure incorporating step 1004 may progress to step 1006. Otherwise, the procedure may progress to step 1008.

At step 1008, it may be determined whether the undetected capability can be added by the migration agent 502 (FIG. 5). For example, the capability augmentation component 510 may determine whether one of the augmentation packages 512-514 provides the capability and is compatible with the virtual machine to which the migration agent 502 has been added. If the capability can be added, the procedure may progress to step 1010. Otherwise, the procedure may progress to step 1006.

At step 1010, it may be determined whether the migration agent 502 (FIG. 5) is authorized to add the capability. For example, the administrator may have authorized the migration agent 502 to add a particular subset of the available augmentation packages 512-514, and the migration agent 502 may check that it is authorized to add the particular augmentation package identified at step 1008. If so, the procedure may progress to step 1012. Otherwise, the procedure may progress to step 1006.

At step 1012, the capability may be added to the virtual machine 302. For example, the migration agent 502 may add the augmentation package 512 to the operating system 312 of the virtual machine 302. At step 1006, the result of the capability detection process may be reported including the results of step 1002, step 1008, step 1010 and step 1012. For example, the report may be provided to the virtual machine migration component 410 (FIG. 4) with the migration agent interface 422.

Figure 11:
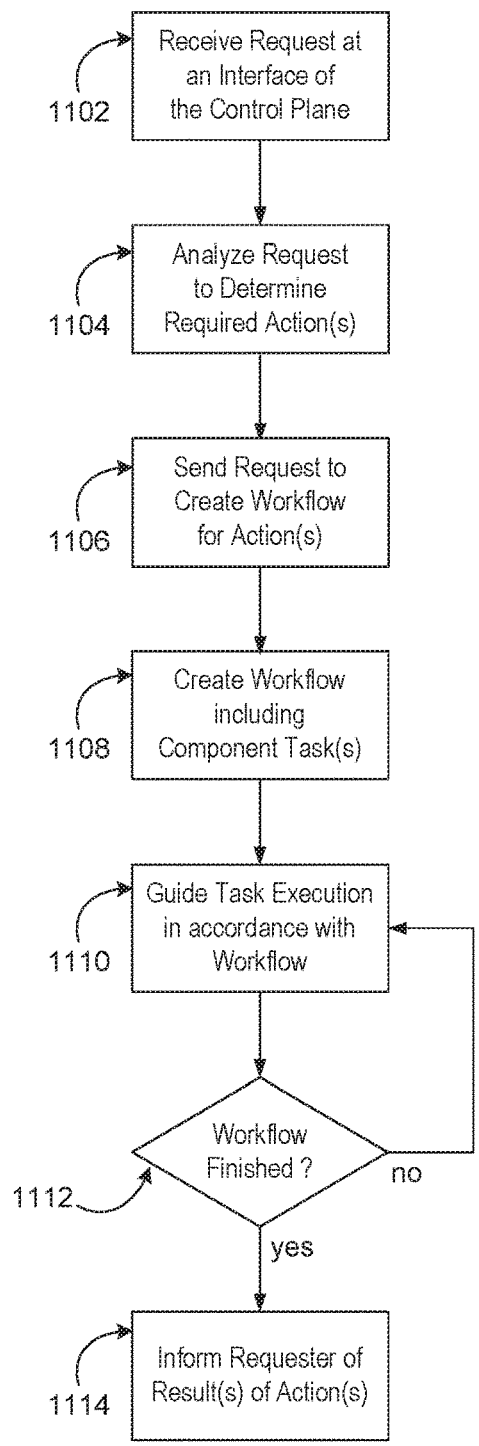
FIG. 11 is a flowchart depicting example steps for workflow management in accordance with at least one embodiment.

As described above with reference to FIG. 4, the control plane 402 may be facilitated by one or more workflows maintained by the workflow component 406. FIG. 11 depicts example steps for workflow management in accordance with at least one embodiment. At step 1102, a request may be received by an interface of the control plane 402 (FIG. 4). For example, one of the user interfaces of the control plane

402 may receive the request from a user, customer and/or administrator of the virtual resource provider 206 (FIG. 2). The request may be a call to a programmatic interface such as an application programming interface (API) or a Web services interface, e.g., utilizing a Simple Object Access Protocol (SOAP) call. Alternatively, or in addition, the request may be received through a graphical user interface (GUI) such as a Web-based GUI. At step 1104, the request may be analyzed to determine one or more actions required to successfully complete the request. For example, the provisioning interface 404 may analyze the request, and determine a set of actions required to provision a set of virtual resources 212. When an interface element receiving the request corresponds to a specific action to be performed, the interface may extract information from the request to be utilized in determining aspects and/or parameters of the action to be performed.

At step 1106, a request may be sent to create a workflow based at least in part on the one or more actions determined at step 1104. For example, provisioning interface 404 (FIG. 4) may send the request to the workflow component 406. The request to create the workflow may include the action(s), action metadata such as type of action, and/or action parameters. In at least one embodiment, the control plane 402 and/or the workflow component 406 maintains a job queue for such requests, and workflows are created responsive to new additions to the job queue. At step 1108, a workflow and one or more component tasks may be created. For example, the workflow component 406 may analyze the request of step 1106 to determine the appropriate workflow and component tasks to create.

At step 1110, execution of the component task(s) may be guided in accordance with the workflow. For example, the workflow component 406 (FIG. 4) may activate elements of interfaces of various implementation resources to provision the set of virtual resources. Alternatively, or in addition, the workflow component 406 may manage bids for execution of the component task(s) by components of the virtual resource provider 206 (FIG. 2). At step 1112, it may be determined whether the workflow has finished. For example, the workflow component 406 may determine whether a final task in a sequence of tasks managed by the workflow has completed. If so, a procedure incorporating step 1112 may progress to step 1114. Otherwise the procedure may return to step 1110 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1114, the sender of the request of step 1102 may be informed of result(s) of the action(s).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a service provider, a migration request that requests migration of a virtual machine of a first virtual machine type by at least morphing the virtual machine, the first virtual machine type having a first combination of resources including at least a processing unit and a data storage device;
providing, based at least in response to receiving the migration request, information describing a set of available migration options for fulfilling the migration request, the set of available migration options including:
information indicating one or more virtual machines types to which the virtual machine of the first virtual machine type is capable of being migrated to, the one or more virtual machine types having different combinations of resources as compared to the first combination of resources; and
information indicating resources for each virtual machine type of the one or more virtual machine types;
filtering the set of available migration options based at least in part on the migration request to determine a candidate set of migration options;
receiving a selection of a migration option from the candidate set of migration options, the migration option corresponding to a second virtual machine type and a particular migration template, the particular migration template comprising a pre-migration reconfiguration task and a post-migration reconfiguration task;
morphing, based at least in part on the particular migration template, the virtual machine from the first virtual machine type to the second virtual machine type; and
migrating, based at least in part on the particular migration template, the virtual machine to a set of implementation resources configured to host one or more virtual machines of the second virtual machine type.

2. The computer-implemented method of claim 1, wherein the first combination of resources further comprises a storage capacity and a network capacity, the method further comprising receiving characterizing information that characterizes the first combination of resources.

3. The computer-implemented method of claim 2, wherein filtering the set of available migration options to determine the candidate set of migration options is further based at least in part on the characterizing information, and wherein providing the information describing the set of available migration options comprises providing information describing the candidate set of migration options.

4. The computer-implemented method of claim 2, wherein receiving the characterizing information comprises receiving the characterizing information from a migration agent executing within the virtual machine.

5. The computer-implemented method of claim 4, further comprising:
   requesting authorization from a user to add the migration agent to the virtual machine; and
   adding, at least in response to receiving the authorization from the user, the migration agent to the virtual machine.

6. The computer-implemented method of claim 2, wherein the characterizing information comprises default characterizing information selected based at least in part on one or more characteristics of the virtual machine.

7. The computer-implemented method of claim 1, wherein morphing the virtual machine from the first virtual machine type to the second virtual machine type comprises live migration.

8. The computer-implemented method of claim 1, wherein:
   each migration template comprises:
      a distinct configuration corresponding to morphing the virtual machine from one virtual machine type to another virtual machine type;
      a pre-migration portion specifying a first pre-migration reconfiguration task to be performed in preparation for morphing of the virtual machine; and
      a post-migration portion specifying a second post-migration reconfiguration task to be performed after morphing of the virtual machine; and
   the selection of the migration option from the candidate set of migration options selects the particular migration template.

9. The computer-implemented method of claim 8, further comprising:
   prior to morphing the virtual machine, reconfiguring one or more components of the virtual machine in accordance with the pre-migration reconfiguration task of a pre-migration portion of the particular migration template; and
   after morphing the virtual machine, reconfiguring the one or more components of the virtual machine in accordance with the post-migration reconfiguration task of a post-migration portion of the particular migration template.

10. A system, comprising:
   a user interface configured to, at least:
      receive a migration request that requests migration of a virtual machine of a first virtual machine type by at least morphing the virtual machine, the first virtual machine type having a first combination of resources including at least a processing unit and a data storage device;
      provide, based at least in part on information about the virtual machine and the migration request, information describing a set of available migration options for fulfilling the migration request, the set of available migration options including:
         information indicating a set of virtual machines types to which the virtual machine of the first virtual machine type is capable of being migrated to, the one or more virtual machine types having different combinations of resources as compared to the first combination of resources; and
         information indicating one or more characteristics corresponding to individual virtual machine types of the set of virtual machine types;
      filter the set of available migration options based at least in part on the migration request to determine a candidate set of migration options;
      receive a selection of a migration option from the candidate set of migration options, the migration option corresponding to a second virtual machine type and a particular migration template, the particular migration template comprising a pre-migration reconfiguration task and a post-migration reconfiguration task; and
   a migration management component configured to, at least:
      morph, based at least in part on the particular migration template, the virtual machine from the first virtual machine type to the second virtual machine type; and
      migrate, based at least in part on the particular migration template, the virtual machine to a set of implementation resources configured to host one or more virtual machines of the second virtual machine type.

11. The system of claim 10, wherein migrating the virtual machine comprises migrating the virtual machine from a different set of implementation resources corresponding to the first virtual machine type to the set of implementation resources corresponding to the second virtual machine type.

12. The system of claim 10, wherein the user interface is further configured to, at least, enable establishment of the particular migration template that comprises:
   a pre-migration portion specifying the pre-migration reconfiguration task to be performed in preparation for morphing of the virtual machine;
   a post-migration portion specifying the post-migration reconfiguration task for adapting to changes as a result of morphing of the virtual machine; and
   a distinct configuration corresponding to morphing of the virtual machine from the first virtual machine type to the second virtual machine type.

13. The system of claim 12, wherein the migration management component is further configured to, at least:
   prior to morphing the virtual machine, reconfiguring one or more components of the virtual machine in accordance with the pre-migration reconfiguration task of the pre-migration portion of the particular migration template; and
   after morphing the virtual machine, reconfiguring the one or more components of the virtual machine in accordance with the post-migration reconfiguration task of the post-migration portion of the particular migration template.

14. The system of claim 12, wherein the selection of the migration option selects the particular migration template, and wherein morphing the virtual machine from the first virtual machine type to the second virtual machine type comprises morphing the virtual machine from the first virtual machine type to the second virtual machine type in accordance with the particular migration template.

15. The system of claim 12, wherein the selection of the migration option selects the particular migration template, and wherein the user interface is further configured to, at least, enable selection of other virtual machines of the first virtual machine type to be morphed to the second virtual machine type in accordance with the particular migration template.

16. The system of claim 10, wherein:
the first combination of resources further comprises a particular storage capacity and a particular network capacity; and
the information about the virtual machine is received from one or more migration agents executing within the virtual machine, the information describing the first combination of resources.

17. The system of claim 10, wherein morphing the virtual machine from the first virtual machine type to the second virtual machine type comprises a reboot migration.

18. One or more non-transitory computer-readable storage media storing computer-executable instructions that, when executed by a processor, configure a computer to perform operations comprising:
receiving a communication from a user of a virtual machine of a first virtual machine type, the communication indicating an intent of the user to migrate the virtual machine such by at least morphing the virtual machine into a different virtual machine type;
providing, based at least in response to receiving the communication, information describing a set of available migration options for migrating the virtual machine, the set of available migration options including:
information indicating a set of virtual machines types to which the virtual machine of the first virtual machine type is capable of being migrated to, the one or more virtual machine types having different combinations of resources as compared to a first combination of resources of the first virtual machine type; and
information describing migration templates for managing migration of virtual machines;
filtering the set of available migration options based at least in part on the communication to determine a candidate set of migration options
receiving a selection of a migration option from the candidate set of migration options, the migration option corresponding to a second virtual machine type and a particular migration template, the particular migration template comprising a pre-migration reconfiguration task and a post-migration reconfiguration task;
configuring, based at least in part on the second virtual machine type, the particular migration template;
morphing, in accordance with the particular migration template, the virtual machine from the first virtual machine type to the second virtual machine type; and
migrating, based at least in part on the particular migration template, the virtual machine to a set of implementation resources configured to host one or more virtual machines of the second virtual machine type.

19. The one or more non-transitory computer-readable storage media of claim 18, wherein migrating the virtual machine to the set of implementation resources comprises migrating the virtual machine from a different set of implementation resources corresponding to the first virtual machine type.

20. The one or more non-transitory computer-readable storage media of claim 19, wherein the different set of implementation resources differs from the set of implementation resources with respect to at least one of: number of physical processing units, number of processing cores per physical processing unit, type of physical processing unit, number of volatile data storage devices, type of volatile data storage device, number of non-volatile data storage devices, type of non-volatile data storage device, number of networking devices, or type of networking device.

* * * * *